Aug. 3, 1943.                F. L. HETZEL                2,325,910
                    AUTOMOTIVE BRAKE TESTING MACHINE
                        Filed Oct. 1, 1941            2 Sheets-Sheet 2
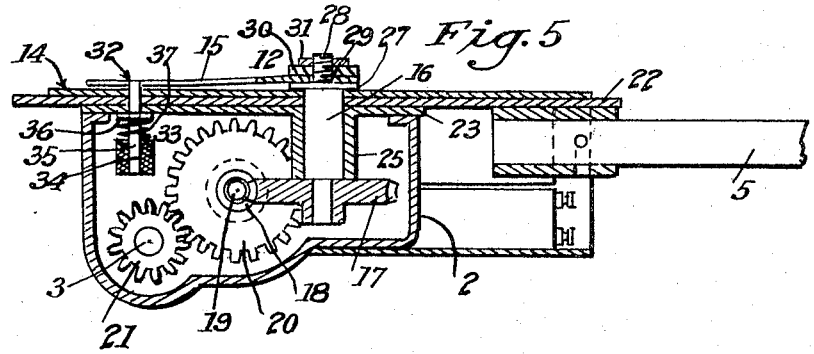
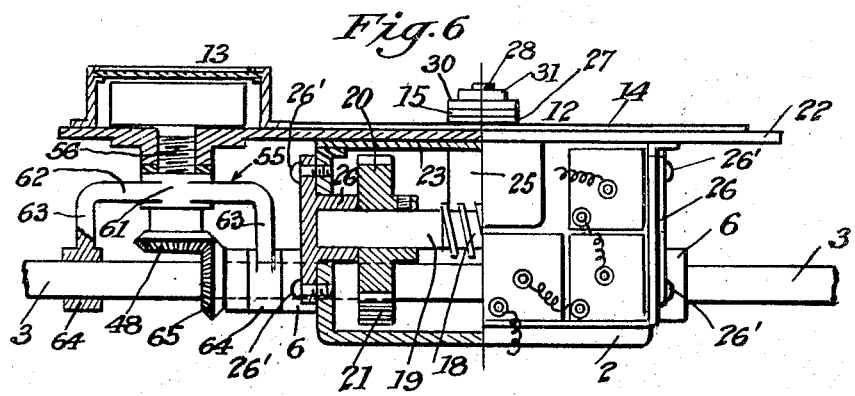
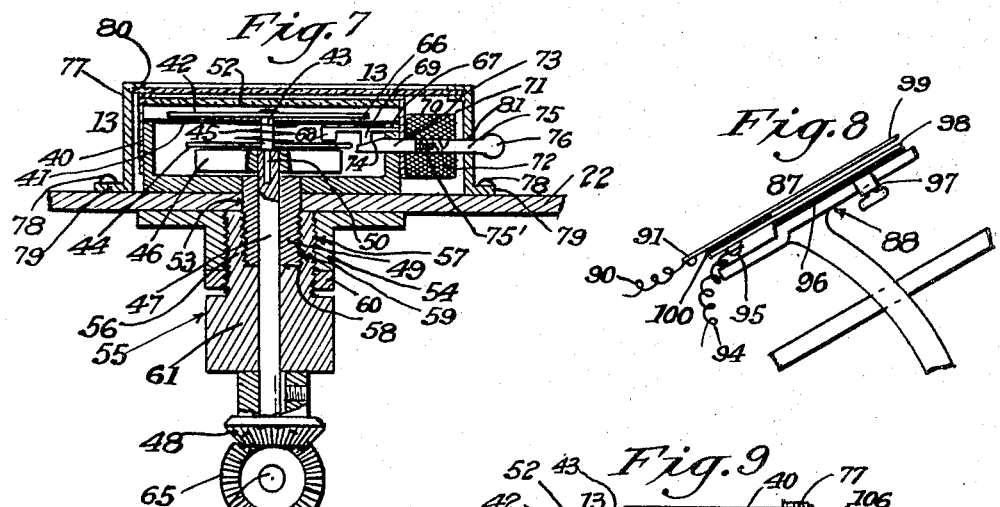
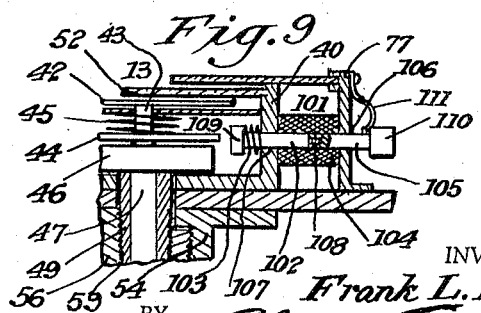
INVENTOR:
Frank L. Hetzel,
BY Alan Franklin
ATTORNEY.

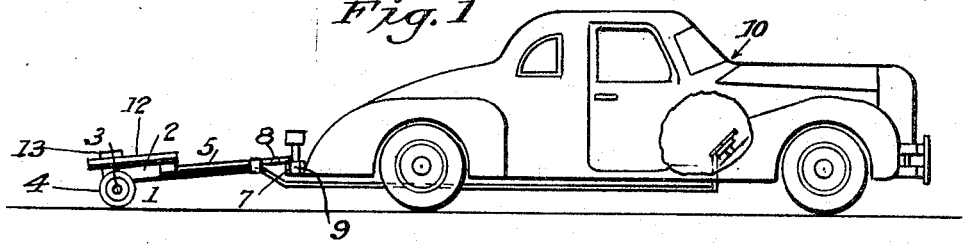
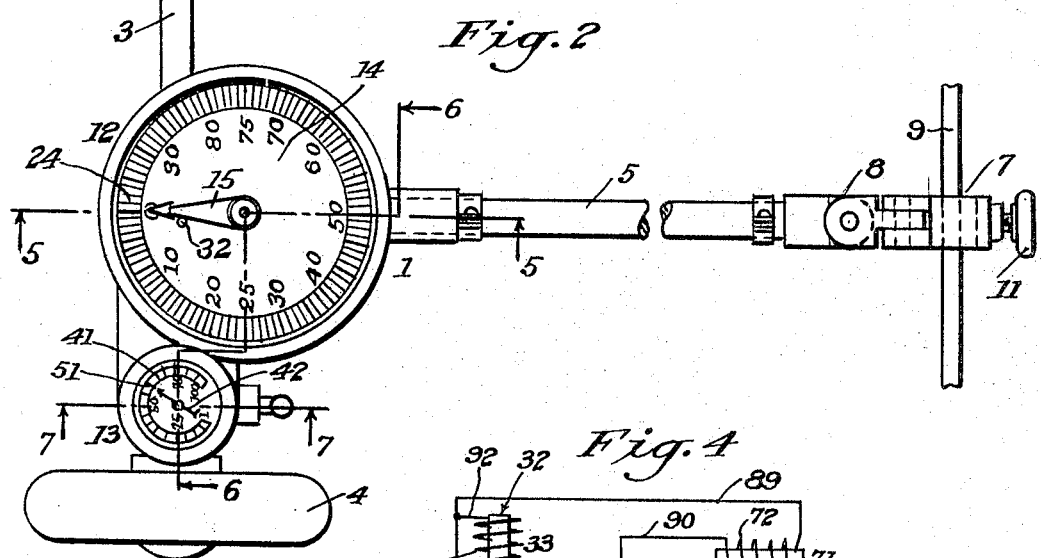
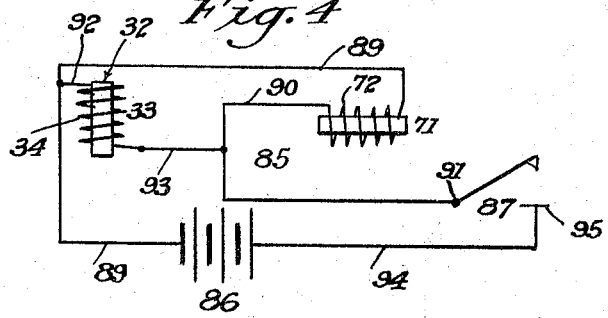
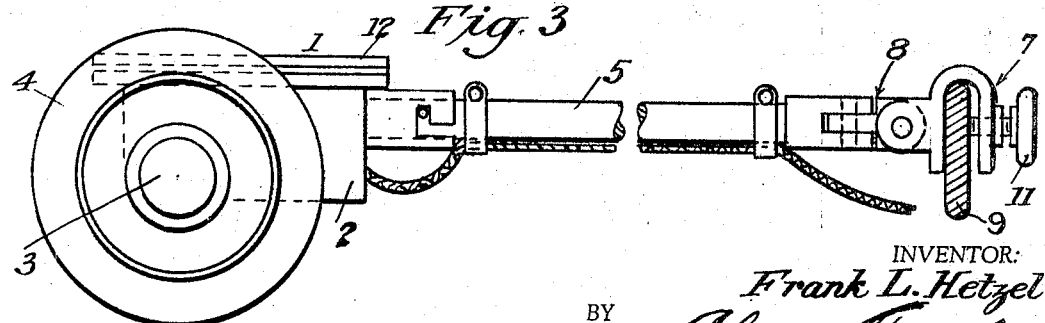

Patented Aug. 3, 1943

2,325,910

UNITED STATES PATENT OFFICE 2,325,910

AUTOMOTIVE BRAKE TESTING MACHINE

Frank L. Hetzel, Hermosa Beach, Calif.

Application October 1, 1941, Serial No. 413,172

3 Claims. (Cl. 73—51)

This invention relates to machines for testing automotive brakes, and the general object of the invention is to provide an improved automotive brake-testing machine, which will record the number of feet within which a motor vehicle may be stopped by its brakes while traveling at a given speed.

A more particular object is to provide an automotive brake-testing machine of the character stated which will be simple, inexpensive and accurate and efficient in operation.

Other objects and advantages will appear hereinafter.

The invention is illustrated in the annexed drawings which form a part of this specification and in which:

Fig. 1 is a side elevation of my invention attached to an automobile for testing the brakes of the automobile.

Fig. 2 is a plan view of my invention on an enlarged scale.

Fig. 3 is a side elevation of my invention on an enlarged scale.

Fig. 4 is a diagram of the electric circuit which controls the operation of my invention.

Fig. 5 is a vertical longitudinal section of my invention taken on line 5—5 of Fig. 2.

Fig. 6 is a transverse vertical section of my invention taken on line 6—6 of Fig. 2, with gear 17 omitted.

Fig. 7 is a vertical section taken on line 7—7 of Fig. 2 showing the speedometer and its operating means of my invention.

Fig. 8 is a side view of the switch of the controlling circuit of my invention and the brake pedal of an automobile to which said switch is attached.

Fig. 9 is a vertical section of a modification of the speedometer brake.

Referring more particularly to the drawings, in which corresponding parts are designated by the same reference characters in all of the figures, my invention embodies a trailer 1, comprising a body 2, an axle 3, wheels 4 on the ends of said axle, and a tongue 5 extending forwardly from said body. The axle 3 is journaled in bearings 6 in the side walls of the body 2. A clamp 7 is connected to the forward end of the tongue 5 by a universal joint 8, which clamp is constructed and arranged to clamp on the rear bumper 9 or any suitable part of a motor vehicle 10, and has a clamp screw 11 for securing the clamp to said bumper. Said universal joint 8 permits the trailer 1 to turn and move up or down with relation to the automobile to which the trailer is connected.

On the trailer 1 is mounted distance measuring meter 12 and a speedometer 13.

The distance-measuring meter 12 includes a dial 14, a dial indicator arm 15, an indicator shaft 16 carrying on its upper end, said indicator arm, a worm wheel 17 secured on the lower end of said indicator shaft 16, a worm 18 in mesh with said worm wheel, a shaft 19 on which said worm is secured, a gear 20 secured on said shaft and a pinion 21 secured on the axle 3 of the trailer 1 in mesh with said gear 20. The dial 14 is secured upon a plate 22 which is secured upon the upper wall 23 of the body 2 of the trailer 1 and said dial is divided by a series of radial graduations 24 indicating feet and inches, from 1 to 100 feet, to which graduations the indicator arm 15 points to indicate the number of feet and inches a motor vehicle travels from the time the brakes of the vehicle are put on or applied until the vehicle stops, as will be hereinafter more fully described. The indicator shaft 16 is journaled in a bearing 25 depending from the upper wall 23 of the body 2 into said body 2. The ends of the shaft 19 are journaled in removable bearings 26 detachably secured to the side walls of the body 2 by screws 26'. The indicator shaft 16 is formed at its upper end with an external annular flange 27 and a threaded stud 28 upstanding from said flange, axially of said shaft, on which stud is turnably fitted the inner end of the indicator arm 15, which is provided with an opening 29, through which said stud loosely extends. On said stud 28 is fitted a washer 30 over said indicator arm 15 and a nut 31 is threaded on the upper end of said stud against said washer, whereby the inner end of the indicator arm 15 is clamped on the stud 28 between the flange 27 and the washer 30. Said indicator arm 15 is clamped between said flange 27 and said washer 30 by said nut 31 with sufficient friction to cause said indicator arm to be turned with the indicator shaft 16, except when said arm is engaged by a stop 32, which overcomes said friction and holds said arm stationary, pointing to the zero graduation 24, while the shaft 16 rotates with its stud 28 turning in said arm and the flange 27 and washer 30 turning against said arm. The stop 32 may be in the form of a solenoid 33, with its coil 34 mounted in the body 2, and its core 35 in the form of a pin extending upwardly through the upper wall of said body 2 and the dial 14, adjacent the inner end and at the left side of the zero graduation 24, there being a flange 36 on said core and a coil spring 37 surrounding said core between said coil 34 and said flange 36, which spring normally holds said core projected upwardly in the position aforesaid for arresting the indicator arm 15 in its zero position as shown in Figs. 2 and 5.

The speedometer 13 includes a casing 40, a dial 41 in the upper part of said casing, an indicator arm 42 above said dial, an indicator shaft 43, on the upper end of which is secured said indicator arm, a soft iron disk 44 secured on said indicator shaft between its upper and lower ends, a return spring 45 coiled around said indicator shaft 43, between said dial 41 and said iron disk 44, and secured at its ends to said dial and said disk respectively, a permanent magnet disk 46, a drive shaft 47, on the upper end of which said magnet disk is secured directly under said soft iron disk 44, a bevel pinion 48 secured on the lower end of said drive shaft, and an externally-threaded bearing 49 depending from the lower wall of said casing 40 in which bearing said drive shaft 47 is journaled. Said drive shaft 47 extends downwardly from within said casing through said bearing 49 and the lower portion 50 of said indicator shaft 43 is reduced in diameter and is journaled axially in said magnet disk 46 and in the upper end of said drive shaft 47, while the upper end of said indicator shaft 43 extends through the dial 41 and is journaled therein. The dial 41 is marked with graduations 51 from 1 to 100 to which the indicator arm 42 points, to indicate the miles per hour that the motor vehicle, to which the trailer 1 is attached, travels. The upper wall 52 of the casing 40 is glass, through which the miles per hour indicated by the indicator arm 42 and the graduations 51 may be read. The casing 40 is mounted on the plate 22 which extends beyond one side of the casing 2, said plate being provided with an opening 53 through which the bearing 49 of said casing depends. To the lower side of the plate 22 is secured an internally-threaded coupling 54 in axial alignment with the opening 53 in said plate. An inverted yoke 55 is formed with an upstanding coupling stud 56 which is externally threaded for threaded engagement with the internally threaded coupling 54, as indicated at 57, and said coupling stud is formed in its upper end with a threaded socket 58 to receive the externally-threaded bearing 49 in threaded engagement therewith, as indicated at 59, whereby the plate 22 is detachably secured to the yoke 55 and the speedometer casing 40 is detachably secured to said yoke upon said plate. A lock nut 60 is threaded on the threaded stud 56 for engaging the lower end of the coupling 54 for locking said stud in different positions in threaded engagement with said coupling. A bearing 61 is formed on the upper connecting member 62 of the yoke 55, through which bearing the drive shaft 47 of the speedometer 13 extends and in which bearing the lower portion of said shaft is journaled. On the lower ends of the depending yoke arms 63 are formed bearings 64, respectively, through which bearings the axle 3 extends and in which bearings said axle is journaled. On the axle 3 between the yoke bearings 64 is secured a beveled pinion 65 in mesh with the beveled pinion 48 on the lower end of the speedometer shaft 47, whereby said speedometer shaft and magnet disk 46 are driven from the axle 3 for operating the speedometer 13. The indicator arm 42 may be held stationary in position pointing to any graduation 51 on the speedometer dial 41, by means of a spring brake 66, one end of which is secured to the side wall of the speedometer casing 40 at 67 and its other end is formed with a shoe 68 for engaging the upper surface of the iron disk 44 to hold said disk, indicator shaft 43 and indicator arm 42 against rotation. The brake 66 is formed with a depending lug 69 to be engaged by a brake-releasing device 70, for releasing the brake from the iron disc 44. Said brake-releasing device 70 may be in the form of a solenoid 71, comprising a coil 72, mounted on the outside of the side wall of the speedometer casing 40, and a steel core 73 extending from said coil through said casing wall into said casing, said core being formed at its inner end with a cam surface 74 for engaging the brake lug 69 for releasing the brake 66 from the iron disk 44, and there being a plunger 75 of non-magnetic material, such as brass, extending into said coil 72 and secured at its inner end by a screw connection 75' to the inner end of the core 73. By means of said plunger 75 the core 73 may be pushed inwardly until its cam surface 74 engages the brake lug 69 and releases the brake 66 from the iron disk 44. The outer end of the plunger 75 may be formed with a knob 76. A housing 77 is placed over the speedometer 13 and the brake-releasing device 70 and is detachably secured in position to the plate 22, by screws 78, extended through an external flange 79 forming the base of said housing, there being an opening 80 in the upper wall of said housing through which the speedometer dial 41 and indicator arm 42 may be seen for reading the speedometer. The side wall of the housing 77 has an opening 81 through which extends the outer end portion of the actuating plunger 75 of the brake releasing device 70.

My brake-testing machine is controlled by an electrical circuit 85 which includes a battery or generator 86 mounted in the body 2 of the trailer 1; the stop solenoid 33 of the distance measuring meter 12; the brake setting solenoid 71 of the speedometer 13; and a switch 87, which is clamped upon the brake pedal 88 of the motor vehicle 10 whose brakes are to be tested by my brake-testing machine. The wiring of the circuit 85 comprises a lead 89 extending from one pole of the generator or battery 86 to one terminal of the coil 72 of solenoid 71; a lead 90 extending from the other terminal of said solenoid to one terminal 91 of the switch 87; a lead 92 extending from lead 89 to one terminal of the coil 34 of stop solenoid 33; a lead 93 extending from the other terminal of said coil 34 to the lead 90; and a lead 94 extending from the other terminal 95 of said switch 87 to the other pole of the generator or battery 86.

The switch 87 comprises a base plate 96 of insulation to which is secured a clamp 97; a metal contact plate 98 secured to said base plate, and on the lower end of which is the terminal 95; a spring-metal contact plate, 99 on the lower end of which is the terminal 91, and a small spacing block 100 of insulation between the lower end portions of said metal contact plate 98 and said spring metal contact plate 99. Said spacing block of insulation 100 is secured to said metal contact plate 98 and said spring metal contact plate 99 is secured to said block of insulation, so that the forward portions of said contact plates are normally spaced apart and the switch 87 is thus normally maintained open. The base plate of insulation 96 is clamped upon the brake pedal 88 by the clamp 97, whereby the switch 86 is clamped in position on said brake pedal to be closed by the foot of the driver of the motor vehicle when he places his foot on the brake pedal 88 and depresses said pedal to apply the brakes of the motor vehicle.

The operation of my invention is as follows:

Normally the switch 87 is held open by the spring action of the spring contact 99 as shown in Fig. 8; the pin 35 of stop 32 is held projected upwardly by the spring 37 adjacent the graduation 24 indicating zero on the dial 14, in the path of movement of the indicator arm 15 of the distance measuring meter 12, as shown in Fig. 5; and the core 73 of the solenoid 70 of the brake-releasing device 70 of the speedometer 13 is projected inwardly so that the cam surface 74 of said core engages the brake lug 69 and holds the brake shoe 68 out of engagement with the iron disk 44, releasing said disk and the indicating arm of the speedometer, as shown in Fig. 7.

When it is desired to test the brakes of an automobile the forward end of the tongue 5 of the trailer 1 is first clamped to the rear bumper 9 or any suitable part of a vehicle by the clamp 7, as illustrated in Fig. 1 of the drawings. The automobile is then driven until it reaches the speed at which its brakes are to be tested, and the trailer 1 is drawn at the same speed by the automobile. The speedometer 13 is operated by the rotating axle 3 of the trailer 1, through the medium of beveled pinions 65 and 48, speedometer drive shaft 47, magnetic disk 46, iron disk 44, indicator shaft 43 and indicator arm 42 and said indicator arm points to the graduation 51 on the speedometer dial 41 indicating the miles per hour at which the automobile is traveling. During said operation the indicator shaft 16 and its stud 28, of the distance measuring meter 12, are rotated by the axle 3 of the trailer 1, through the medium of pinion 21, gear 20, shaft 19, worm 18 and worm gear 17, but the indicator arm 15 is held stationary against rotation, pointing to the zero graduation 24 on the dial 14, by the stop 32, the stud 28 turning in the opening 29 in said indicator arm 15, and the flange 27 and washer 30 turning in frictional contact against opposite sides respectively of said indicator arm. When the automobile has reached the speed at which its brakes are to be tested, as aforesaid, the driver of the automobile places his foot on the brake pedal 88 and depresses said pedal to the limit of its movement, during which operation the driver's foot depresses the spring contact 99 against the contact 98 of the switch 96, and closes said switch and the circuit 85. Electric current then passes from the generator or battery 86 through lead 89, coil 72 of solenoid 71, lead 90 to switch terminal 91, of switch 87, and from lead 89 current passes through lead 92, coil 34 of solenoid 33, lead 93 and lead 90 to switch terminal 91, through switch 87 and its terminal 95 and through lead 94 to the other pole of the generator or battery 86. The coils 72 and 34 of the solenoids 71 and 33 respectively, being energized by the closing of the circuit, the core 73 is drawn into the coil 72 of solenoid 71, and the core 35 is drawn into the coil 34 of the solenoid 33. As the core 73 is drawn into the coil 72 the cam surface 74 of said core is withdrawn from under the brake lug 69 and the brake 66 springs against the iron disk 44 of the speedometer 13 and holds said disk, indicator shaft 43 and indicator arm 42 stationary, with said indicator arm pointing to the speedometer graduation 51 indicating the miles per hour at which the automobile was traveling when the driver of the automobile depressed the brake pedal 88. As the core 35 is drawn into the coil 34 of the stop solenoid 33 said core is drawn below the indicator arm 15 of the distance measuring meter 12 and thereby releases said indicator arm, whereupon the frictional engagement of said arm by the flange 27 and the washer 30 causes the indicator shaft 16 and its stud 28 to rotate said indicator arm, until the automobile is brought to a stop by its brakes, with said indicator arm pointing to the graduation 24 on the dial 14 indicating the distance which the automobile traveled while being brought to a stop by its brakes. Thus the number of feet in which an automobile traveling at a given speed may be brought to a stop by its brakes is indicated by the distance measuring meter 12 and speedometer 13 of my brake testing machine.

The modification of the speedometer brake shown in Fig. 9 of the drawings includes a solenoid 101, a brake plunger 102 of non-magnetic material, such as brass, and a plunger spring 103, the coil 104 of said solenoid being mounted on the outside of the speedometer casing 40 between said casing and the housing 77, and the core 105 of said solenoid extending outwardly beyond the side wall of said housing through an opening 106 in said side wall. The brake plunger 102 extends through an opening 107 in the side wall of the speedometer casing 40 into the solenoid coil 104 and the inner end of said plunger is secured to the inner end of the solenoid core 105 by a screw connection 108. The outer end of the brake plunger 102 extends into the speedometer casing 40 and is formed with a brake shoe 109, which rests opposite the periphery of the speedometer iron disk 44, while the plunger spring 103 is coiled around said brake plunger between the side wall of the speedometer casing 40 and said brake shoe 109 and urges said plunger forwardly and said shoe towards the periphery of said iron disk. A knob 110 is formed on the outer end of the solenoid core 105 and a spring latch 111, secured at one end to the outside of the side wall of the housing 77, normally engages at its other end the rear edge of said knob 110 and holds said core and brake plunger 102 against the tension of spring 103, in position with the plunger brake shoe 109 withdrawn and released from the periphery of said iron disk 44. The solenoid coil 104 is included in the brake-testing circuit 85 in the place of the solenoid coil 72, and upon depression of the brake pedal 88 and closing of the switch 87 the solenoid 101 is energized and the core 105 is drawn into the coil 104 of said solenoid, the core knob 110 escaping the spring latch 111, while the plunger 102 is correspondingly moved by said core until the plunger brake shoe 109 engages the periphery of the iron disk 44 and brakes the speedometer 13, holding the speedometer indicator arm 42 pointing to the graduation 51 indicating the speed at which the vehicle was traveling when the brake pedal 88 was depressed. The spring 103 holds the plunger 102 and core 105 in braking position with the brake shoe 109 against the periphery of the iron disk 44, when the brake pedal 88 is released and the switch 87 springs open so that the circuit 85 is broken and the solenoid 101 is deenergized. The brake continues to brake the speedometer and hold the indicator arm 42 pointing to said speed graduation 51, as aforesaid, until the knob 110 of the solenoid core 105 is grasped by the operator and the solenoid core 105 and brake plunger 102 are pulled outwardly and the brake shoe 109 is thereby released from the periphery of the iron disk 44 and held in released position by the engagement of the spring latch 111 with the inner side of said knob 110, whereupon the speedometer is free to operate normally.

I do not limit my invention to the exact construction herein disclosed, since various changes may be made therein without departing from the spirit of the invention.

I claim:

1. A machine for testing automotive brakes including a trailer, means for connecting said trailer to an automobile, a speedometer mounted upon said trailer, said speedometer including a drive shaft, means whereby said drive shaft is driven by said trailer, a magnetic disc on said drive shaft, an indicator shaft, an iron disc on said indicator shaft adjacent said magnetic disc, an indicator arm on said indicator shaft, a dial on which are speed graduations to which said indicator arm is adapted to point, and a spring for normally holding said indicator arm in position pointing to the zero speed graduation on said dial, a spring brake for said iron disc, a solenoid including a coil, a core formed with a cam surface, and means for projecting said core beyond said coil so that its cam surface will engage said brake and release it from said iron disc, a distance measuring meter mounted upon and to be operated by said trailer, a stop for normally arresting the indicator arm of said meter in its zero position, an electrical circuit including a generator, said solenoid, a switch on the brake pedal of the automobile to which said trailer is connected, which switch is closed by pressure of one's foot when applied to said brake pedal to depress the same to close said circuit, whereby the core of said solenoid is withdrawn from said brake to enable said brake to spring against said iron disc to arrest the indicator arm of said speedometer, and means actuated by said circuit, when closed by said switch, for withdrawing said stop from the indicator arm of said distance measuring meter to enable said trailer to drive said meter until the automobile is brought to a stop by its brakes upon depression of said brake pedal.

2. A machine for testing automobile brakes including a trailer, means for connecting said trailer to an automobile, a speedometer mounted upon and operated by said trailer, a brake for said speedometer, a brake-releasing device for normally releasing said brake from the speedometer to enable said trailer to operate said speedometer, a distance measuring meter mounted upon said trailer, said distance measuring meter including an indicator shaft, means whereby said shaft is driven by said trailer, an indicator arm turnably mounted on said indicator shaft, frictional means for holding said indicator arm against turning on said shaft, a dial on said meter with graduations indicating feet, a stop on said meter for normally arresting said indicator arm pointing to the zero graduation on said dial, an electrical circuit including a battery, a switch on the brake pedal of the automobile to which said trailer is connected, which switch is closed by one's foot when applied to said brake pedal to depress the same, means actuated by said circuit, when closed by said switch, for withdrawing said brake releasing device from said speedometer brake to enable said brake to apply itself to said speedometer to arrest the speedometer indicating arm, and means actuated by said circuit, when closed by said switch, for withdrawing said stop from said indicator arm of said distance-measuring meter to enable said indicator shaft to rotate said indicator arm over said dial until the automobile is brought to a stop by its brakes.

3. In a machine for testing automotive brakes including a trailer, means for connecting said trailer to an automobile, a speedometer mounted upon said trailer, said speedometer including a drive shaft, means whereby said drive shaft is driven by said trailer, a magnetic disc on said drive shaft, an indicator shaft, an iron disc on said indicator shaft adjacent said magnetic disc, an indicator arm on said indicator shaft, a dial on which are speed graduations to which said indicator arm is adapted to point, and a spring for normally holding said indicator arm in position pointing to the zero speed graduation on said dial, a brake for said iron disk including a solenoid with a coil and a core, a brake plunger connected to the core of said solenoid and extending toward the periphery of said iron disk, a brake-testing electrical circuit including a battery, the coil of said solenoid, and a switch on the brake pedal of the vehicle to which said trailer is connected, which switch is closed by the pressure of one's foot when applied to said brake pedal to depress the same to close said circuit, whereby the core of said solenoid is drawn into the coil of said solenoid and said brake plunger is forced against the periphery of said iron disk to arrest the indicator arm of said speedometer.

FRANK L. HETZEL.